US007508761B2

(12) United States Patent
Rogasch et al.

(10) Patent No.: US 7,508,761 B2
(45) Date of Patent: Mar. 24, 2009

(54) METHOD, COMMUNICATION ARRANGEMENT, AND COMMUNICATION DEVICE FOR TRANSMITTING MESSAGE CELLS VIA A PACKET-ORIENTED COMMUNICATION NETWORK

(75) Inventors: Volker Rogasch, Greifswald (DE); Rüdiger Schalk, Süderholz (DE)

(73) Assignee: Nokia Siemens Networks GmbH & Co KG, Munich (DE)

( * ) Notice: Subject to any disclaimer, the term of this patent is extended or adjusted under 35 U.S.C. 154(b) by 629 days.

(21) Appl. No.: 10/521,830

(22) PCT Filed: Jul. 11, 2003

(86) PCT No.: PCT/DE03/02354

§ 371 (c)(1),
(2), (4) Date: Jan. 21, 2005

(87) PCT Pub. No.: WO2004/017572

PCT Pub. Date: Feb. 26, 2004

(65) Prior Publication Data

US 2006/0104287 A1    May 18, 2006

(30) Foreign Application Priority Data

Jul. 25, 2002   (DE)   ................ 102 33 954

(51) Int. Cl.
*H04L 12/56* (2006.01)
*H04J 3/24* (2006.01)
(52) U.S. Cl. ............ 370/235; 370/395.42; 370/474
(58) Field of Classification Search ............ 370/235, 370/395.42, 474
See application file for complete search history.

(56) References Cited

U.S. PATENT DOCUMENTS 6,011,778 A * 1/2000 Kilkki et al. ........... 370/232

(Continued)

FOREIGN PATENT DOCUMENTS

DE   100 50 608 A1   4/2002

(Continued)

OTHER PUBLICATIONS

Rui Rocha and Jose B. Gerald, "802.11 WLAN: can it be used as a wireless access to ATM Networks?", Departamento de Engenharia Electrotecnica e de Computadores [online], Jun. 2000, Internet URL:http://asterix.ist.utl.pt/~rmr/artigos/epcm-abstract.htm, pp. 1-4.

(Continued)

*Primary Examiner*—Alpus H Hsu
(74) *Attorney, Agent, or Firm*—Bell, Boyd & Lloyd LLP

(57) ABSTRACT

Message cells, cell comprising partially different priorities are transmitted via a first communication network. According to the invention, at least one of the message cells to be transmitted and comprising the same priority is added to a user data field of at least one data packet of a second packet-oriented communication network. A transmission priority (user priority) derived from the priority of the at least one added message cell, cell is associated with the data packet, according to which the at least one data packet is at least partially transmitted with the at least one added message cell, cell to/via the packet-oriented communication network. Advantageously, the message cells comprising the same priority or service category and pertaining to different virtual connections are added to a data or transmission frame of the packet-oriented communication network, thus fulfilling real time requirements.

20 Claims, 4 Drawing Sheets

U.S. PATENT DOCUMENTS

| | | | |
|---|---|---|---|
| 6,081,524 A * | 6/2000 | Chase et al. | 370/389 |
| 6,188,671 B1 * | 2/2001 | Chase et al. | 370/232 |
| 6,295,283 B1 * | 9/2001 | Falk | 370/325 |
| 6,404,749 B1 * | 6/2002 | Falk | 370/325 |
| 6,411,617 B1 * | 6/2002 | Kilkki et al. | 370/353 |
| 6,434,153 B1 * | 8/2002 | Yazaki et al. | 370/395.21 |
| 6,778,498 B2 * | 8/2004 | McDysan | 370/231 |
| 6,847,611 B1 * | 1/2005 | Chase et al. | 370/232 |
| 6,967,927 B1 * | 11/2005 | Dugeon et al. | 370/236.1 |
| 6,970,470 B2 * | 11/2005 | Yazaki et al. | 370/395.42 |
| 7,177,281 B2 * | 2/2007 | Heiss et al. | 370/235 |
| 7,180,859 B1 * | 2/2007 | Heiss et al. | 370/235 |
| 7,203,198 B2 * | 4/2007 | Knight et al. | 370/395.54 |
| 7,257,118 B2 * | 8/2007 | Chase et al. | 370/392 |
| 2003/0099261 A1 * | 5/2003 | Jacobsen et al. | 370/542 |

FOREIGN PATENT DOCUMENTS

WO  WO 99/16213 A2  4/1999

OTHER PUBLICATIONS

"Frame-based ATM Transport over Ethernet (FATE)—AF-FBATM-0139.00", ATM Forum Technical Committee, XX, XX, Feb. 2000, pp. 1-11, XP002260617.

Shara Evans, "Standards Watch: 802.1p—A Start at Ethernet Prioritisation", Internet Article, Online, Sep. 1998, pp. 1-3, XP002267452, Retrived from the Internet: <URL:http://www.tellsyte.com.au/standardswatch/802.1p.htm>.

Z. Mammeri and K.-D. Haouam, Connection Allocation Schemes for Guaranteeing Hard Real-Time Communications with ATM Network, Factory Communication Systems, 1997, Proceedings, 1997 IEEE International Workshop on Barcelona, Spain, Oct. 1-3, 1997, New York, NY, USA, IEEE, US, Oct. 1, 1997, pp. 203-212, XP010255544.

Lawrence C. Roberts, "Request for Coordination of Cells in Frames Specifications", Internet Article, Online, Aug. 19, 1996, Baltimore, US, Retrieved from the Internet: <URL:http://www.ziplink.net/{lroberts/Atmf-961104.html>, pp. 1-45, XP002267451.

J. M. Arco, A. Martinez, B. Alarcos, A. Garcia, D. Meziat; "Carrying ATM Cells Over Ethernet"; 25th Euromicro Conference; vol. 2; Sep. 1999; 8 pages.

* cited by examiner

METHOD, COMMUNICATION ARRANGEMENT, AND COMMUNICATION DEVICE FOR TRANSMITTING MESSAGE CELLS VIA A PACKET-ORIENTED COMMUNICATION NETWORK

CROSS REFERENCE TO RELATED APPLICATIONS

This application is the U.S. National Stage of International Application No. PCT/DE03/02354, filed Jul. 11, 2003 and claims the benefit thereof. The International Application claims the benefits of German application No. 10233954.6 filed Jul. 25, 2002, both of the applications are incorporated by reference herein in their entirety.

FIELD OF INVENTION

This invention relates to a method, communication arrangement, and communication device for transmitting message cells via a packet-oriented communication network.

BACKGROUND OF INVENTION

The optimization of current communication networks, in particular of broadband user access networks—also known as access networks—aims to ensure access to broadband services—e.g. Video-On-Demand—for a large number of users at a reasonable price. One optimization possibility is to distribute the devices and resources provided by the user access networks (e.g. bandwidth and processing speed) over as many user connections as possible. A further cost optimization possibility is to arrange the intelligent functions required for current message services largely central in the user access network, so that, for example, the user access assemblies or central assemblies arranged in the communication network, or in the respective network devices, only require to be equipped with as little functionality as possible.

Further, the technological and economic costs involved in realizing network devices that can be arranged in current communication networks can be reduced by using technologies not developed especially for broadband user access networks but for the mass markets (e.g. personal computers). As an example of such a widespread and correspondingly developed technology one might mention the Ethernet standardized in accordance with Standard IEEE 802.3, which provides a frame or a packet oriented and connectionless transmission procedure. Ethernet based transmission systems are mainly used in local communication networks. In the case of network devices, such as for example multiplex devices (e.g. DSLAM, Digital Subscriber Line Access Multiplexer), that can be arranged in current communication networks, it is for example known, to convey message cells organized according to the asynchronous transmission mode-ATM—also referred to as ATM cells—via an Ethernet arranged locally in the network device between user access assemblies arranged in the network device and at least one central unit or assembly comprising the central functions of the network device. The Ethernet can be used both as "wiring" or "backplane" in an assembly rack to bridge smaller distances within the network device as well as an area-wide communication network to bridge larger distances.

The aim of future communication networks is to transmit ever greater data volumes at high transmission rates from and to the end user, whereby this is to be achieved in particular by using Ethernet based transmission procedures. To achieve a transition from ATM based systems whose realization involves great technical and hence financial costs to reasonably priced Ethernet based systems, it is especially necessary to run the ATM Service via system interfaces that are already based on Ethernet transmission technologies in current communication networks. Thereby, in particular the ATM transmission technology "Quality Of Service characteristics" must be maintained, whereby the available transmission capacity of current communication networks must be utilized to a satisfactory degree.

In the publication "ATM Forum, Technical Committee, Frame-based ATM Transport over Ethernet (FATE), AF-FBATM-0139.00, Feb. 2000" there is, for example, the description of a method by which ATM cells are transmitted via a communication network set up as an Ethernet. A disadvantage of the method described is that it is limited to ATM connections of the type AAL5. Thus this method can only be used to a limited extent in current and future user access networks, as in these networks, when current data and communication services are realized, ATM cells of all AAL types are transmitted, especially the type AAL1 and AAL2. A further disadvantage of this method is that just the user information in the respective ATM cells to be transmitted via the Ethernet—i.e. transport by AAL5 SSCS-PDUs—is added to the respective user data field of the Ethernet frame, which makes it necessary for the ATM cells that are to be transmitted to undergo a pre-processing procedure involving a technological input. This approach to a solution cannot be used in current user access networks as the AAL5 termination occurs with the user—i.e. at the CPE, Customer Premises Equipment—and the transmission system for the transmission of AAL5 information should be transparent. With the known method, a transparent transmission of the ATM cells via the Ethernet is not possible.

In addition, with the known method an own Ethernet frame is used to the disadvantage of each virtual connection—PVC, Permanent Virtual Connection—set up within the ATM communication network. Depending on the length of the frame, there is a delay for individual ATM cells, as incoming cells must be held in intermediate storage until the Ethernet frame is full. This is especially unfavorable for real time applications. An obvious alternative of adding only one single ATM cell into each Ethernet frame results, however, in the transmission resources provided by the communication network being poorly utilized.

SUMMARY OF INVENTION

Thus the object of the invention is to improve the transmission of ATM cells via a packet or frame oriented communication network. In particular, a user access network should be created, in which ATM cells comprising different AAL types and belonging in part to different ATM connections are transmitted transparently while retaining the Quality Of Service characteristics by means of the packet or frame oriented transmission technology, and in particular by means of the Ethernet transmission technology. Based on a method according to the claims, the object is achieved using the distinguishing features of said method. Further, based on a communication arrangement as well as on a communication device in accordance with the claims, the object is achieved using the respective distinguishing features of said arrangement and device.

With the method according to the invention, message cells to be transmitted in a first communication network are transmitted, at least in part, via a second packet-oriented communication network. In the first communication network, several priorities are provided which can be allocated respectively to the message cells to be transmitted, whereby the message cells are transmitted via the first communication network according to the priorities allocated in each case. The essential aspect of the method according to the invention is that at least one of the message cells to be transmitted and having the same priority allocated is added to a user data field of at least one data packet of the second packet-oriented communication network. A transmission priority derived from the priority of the at least one added message cell is assigned to the at least one data packet, whereby the at least one data packet together with the at least one added message cell is at least partially transmitted to/via the second packet-oriented communication network according to the transmission priority assigned.

The main advantage of the method according to the invention lies in that the above mentioned disadvantages of the method arising from the FATE standard are avoided. As opposed to the method described in the standard, the information to be transmitted is transmitted transparently via the packet-oriented communication network, thus the technical and financial costs for preprocessing the information to be transmitted can be saved. In particular, the method according to the invention enables optimal utilization of the user access network-specific, star shaped connection structure in which several users are connected via the user access network or access network to a network entry point of a higher communication network. Advantageously, the message cells comprising the same priority or service category and pertaining to different virtual connections can be added to a data or transmission frame of the packet-oriented communication network. In this way the individual data packets and/or transmission frames are better filled within the preset time limits (Time Outs), hence complying with the preset priorities and/or real time requirements, thus achieving optimal utilization of the transmission resources provided by user access networks. Further the method according to the invention is not limited to a specific connection type such as, for example, to type AAL5 ATM connections.

Advantageously, insert functions are provided in the first and/or second communication network, by means of which functions for each priority provided in the first communication network respectively
- the at least one data packet comprising the correspondingly derived transmission priority is formed,
- the at least one message cell comprising the corresponding priority is added to the user data field of the at least one data packet formed,
- the at least one data packet is at least partially transmitted to/via the second communication network.

By means of this advantageous development the data transmission according to the invention can make use of a number, corresponding to the number of the priorities provided in the first communication network, of transmission instances—for example, Ethernet instances—with different prioritizing in order to realize the method according to the invention.

Advantageously, the message cells to be transmitted via the first communication network are transmitted within the framework of virtual connections established across the first communication network, whereby the respective allocated priority of the respective message cells transmitted via one of the virtual connections represents a connection-particular priority. Thanks to this advantageous design, message cells (for example, ATM cells), which are allocated to different virtual connections, i.e. which have different VPI/VCI values, but have the same priority or are allocated the same service category, are together added to a data packet of the packet-oriented communication network. This achieves optimal utilization of the transmission resources provided by the packet-oriented communication network.

According to a further advantageous embodiment of the method according to the invention, at least one further connection-particular transmission parameter in addition to the connection-particular priority is allocated to the message cells respectively transmitted via one of the virtual connections of the first communication network—Claim 4.

Advantageously, the insert functions are designed in such a way that the at least one message cell to be transmitted and comprising the same assigned priority is added to the user data field of the respective at least one data packet and the at least one data packet is at least partially forwarded to/via the packet-oriented communication network according to the respectively assigned connection-particular transmission parameter of the respectively at least one message cell added to the user data field. Using this advantageous embodiment ensures in particular that Quality Of Service characteristics provided by certain transmission procedures are retained. As part of this development, the relevant data packets or frames formed are sent by the insert instances each comprising different priorities if one of the following conditions is fulfilled:
- The payload quota of the respective data packet or frame formed is filled, or
- a preset dwell time of the at least one message cell added to the user data field of the data packet is exceeded when filling the user data field.

Thus regardless of the respective data traffic volume, preset delays are not exceeded.

According to a further development of the method according to the invention, the first communication network is designed in accordance with the asynchronous transfer mode-ATM, and the packet-oriented communication network and the data packets transmitted in said network designed according to the IEEE Standard 802.3.

Advantageously, the insert functions are designed in such a way that the at least one message cell to be transmitted and comprising the same allocated priority is added to the user data field of the respective at least one data packet and the at least one data packet is at least partially forwarded to/via the packet-oriented communication network according to the smallest preset "Cell Delay Variation Tolerance" value of the respective at least one message cell added to the user data field. By means of this advantageous development of the method according to the invention, the time for filling a data packet is monitored, thus ensuring that the message cells to be transmitted are not unacceptably delayed and that the current data packet formed is sent or forwarded on schedule.

Advantageously, the data packets transmitted via the second packet-oriented communication network are in addition designed according to the Standard IEEE 802.1Q-1998, whereby the transmission priority respectively allocated to a data packet transmitted via the second communication network is determined by the "user_priority" information in the "Tag Control Information" data field (TCI) of the "Ethernet encoded tag header". By means of this advantageous development and using the IEEE Standard 802.1Q-1988, it is made especially easy to assign ATM Service Classes directly to "Ethernet User Priorities".

Further advantageous embodiments of the method according to the invention and a communication arrangement and a communication device are to be found in the further claims.

BRIEF DESCRIPTION OF THE DRAWINGS

In the following the method according to the invention is explained in greater detail with the help of several drawings.

These show.

DETAILED DESCRIPTION OF INVENTION

Figure 1:
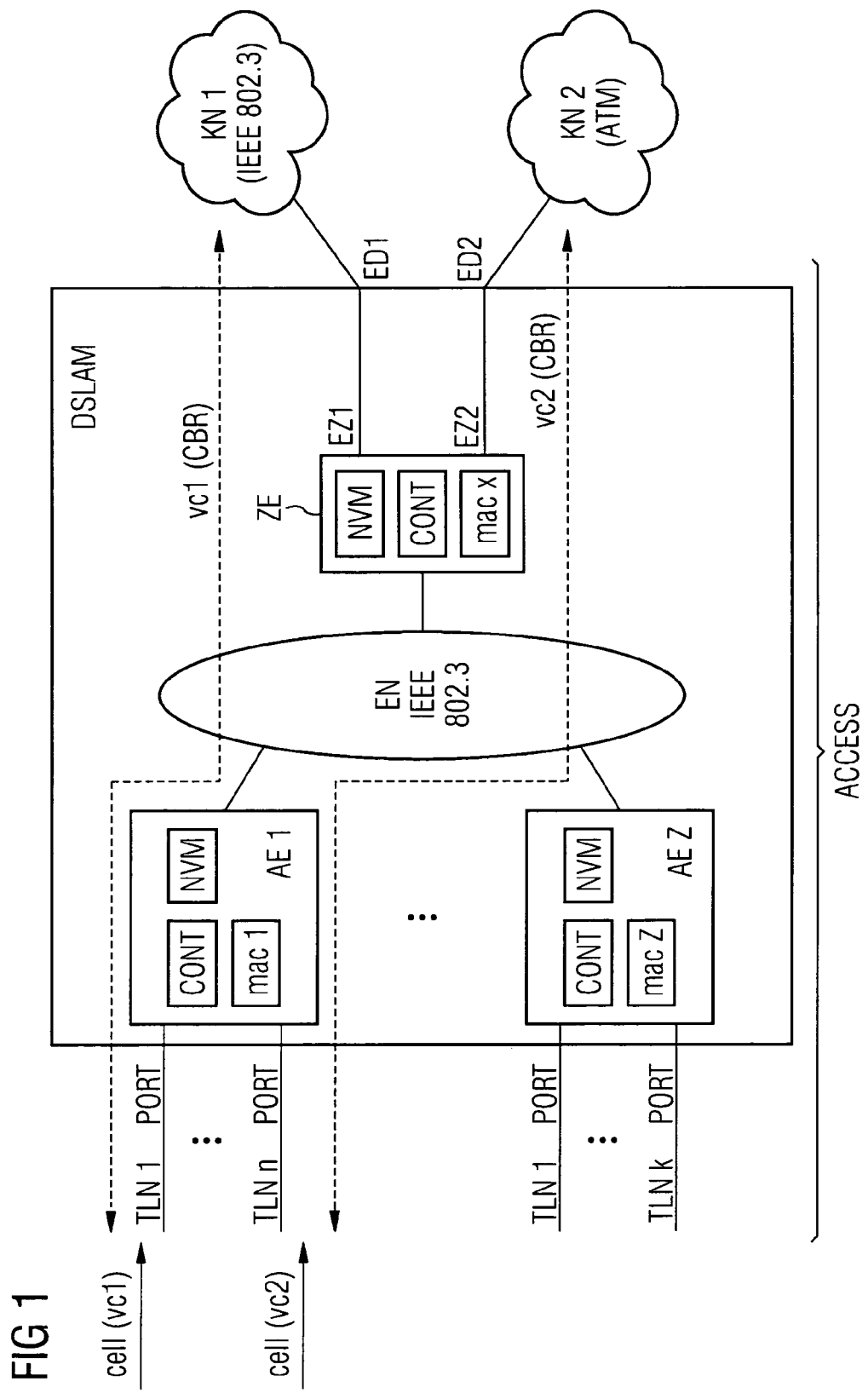
FIG. 1 an application scenario arranged in a user access network, in which scenario the method according to the invention is brought into action, FIG. 2 a connection unit arranged in a multiplexer device (DSLAM) for realizing the method according to the invention, FIG. 3 the structure of a control unit arranged in a connection unit or in a central unit for executing the method according to the invention, FIG. 4 in a functional logic diagram, the ATM specific processing of the information or ATM cells to be transmitted under the method according to the invention, FIG. 5 in a functional logic diagram, the Ethernet specific processing of the information or ATM cells to be transmitted under the method according to the invention, FIG. 6 an Ethernet frame formed in accordance with the method according to the invention and within the scope of the IEEE Standard 802.1Q-1988 and having ATM cells added to the user data field and an assigned or "mapped" ATM Service Class or transmission priority.

In a logic diagram, FIG. 1 shows a communication device or multiplex device DSLAM arranged in a user access network or access network ACCESS designed according to the asynchronous transfer mode—ATM—, to which communication device the respective users—or CPE, not illustrated—are connected via several connection units AE1 . . . Z and via several user access lines TLN1 . . . n or TLN1 . . . k. In this embodiment, the respective users are connected, for example, via an xDSL transmission procedure to connections PORT correspondingly provided for this purpose, of the respective connection units AE1 . . . z. A packet-oriented communication network EN—also called "Ethernet" in the following—designed in accordance with the IEEE Standard 802.3, is arranged in the communication device DSLAM, and to which communication network are attached the respective connection units AE1 . . . z. Another central unit ZE arranged in the center of the communication device DSLAM is connected to the Ethernet EN. An Ethernet MAC address mac1 . . . x . . . z (MAC, Medium Access Control) is assigned to the connection units AE1 . . . z as well as to the central unit ZE respectively, which address uniquely identifies them within the Ethernet EN.

The central unit ZE is connected to a first input ED1 of the communication device DSLAM via a first input EZ1. Connected to this first input ED1 there is a first higher communication network KN1, also designed, for instance, in accordance with the IEEE Standard 802.3. The first higher communication network KN1 can also, for instance, be designed as a Gigabit Ethernet, which is, for example, connected to the first input ED1 of the communication device DSLAM via a 1000 BASE LX connection.

The central unit ZE arranged in the communication device DSLAM has a second input EZ2, which is connected to a second input ED 2 provided in the communication device DSLAM. In accordance with the application scenario, a further higher communication network KN2, designed in accordance with the asynchronous transfer mode ATM, is connected to this second input ED 2.

The users connected to the communication device DSLAM are connected to the two higher communication networks KN1, KN2 via the respective connection units AE1 . . . z, via the Ethernet EN and via the central unit ZE. Control tools CONT for carrying out the method according to the invention are provided in the respective connection units AE1 . . . z as well as in the central unit ZE. Further network processing tools NVM, for example, to carry out traffic management and process header information (header translation) are allocated to the control tools CONT arranged in the respective units AE1 . . . z, ZE. At least the network processing tools NVM provided on the central unit ZE can include additional tools to carry out segmentation and reassembly (e.g. AAL5 SAR).

Figure 2:
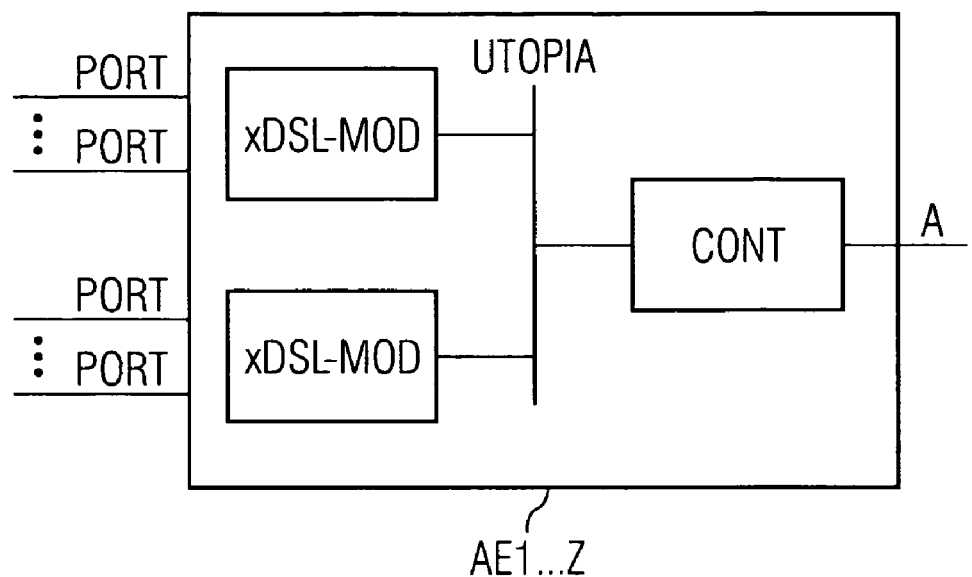

In FIG. 2 the structure of a connection unit AE1 . . . z arranged in the communication device DSLAM on the user side is illustrated. Arranged in the connection unit AE1 . . . z are several xDSL modems xDSL-MOD, to each of which a user access line TLN designed in accordance with the xDSL transmission procedure is connected via an appropriately designed connection PORT. The individual xDSL modems are connected to the control unit CONT via a Utopia interface UTOPIA in accordance with the ATM transmission procedure. The control unit CONT is connected to the Ethernet EN—not illustrated in FIG. 2—via an internal interface, for example an xMII interface, Medium Independent Interface—and via a connection A. The central unit ZE, which is not described in detail, is designed correspondingly.

Figure 3:
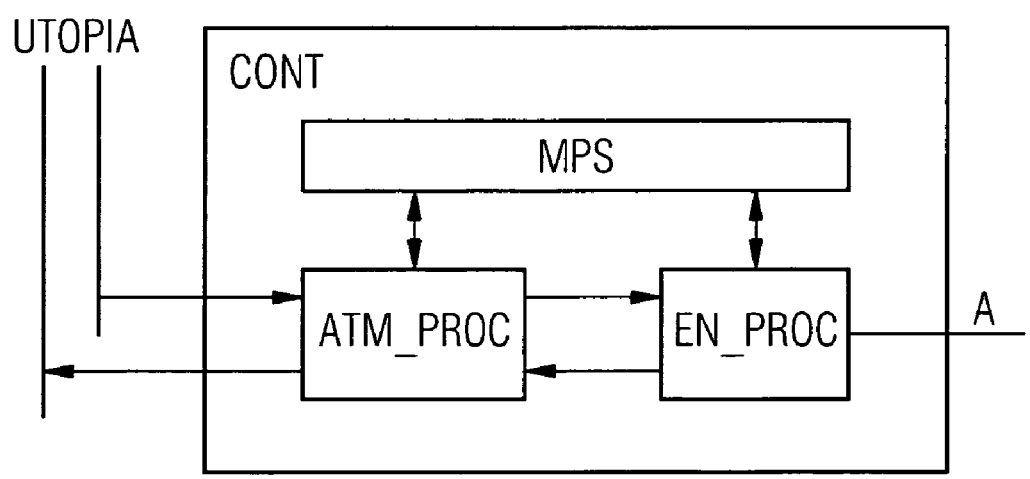

In FIG. 3 the functional structure of the control unit CONT arranged in each connection unit AE1 . . . z or central unit ZE is described in more detail. The control unit CONT —also called a converter—is made up of an ATM specific processing stage ATM_PROC and an Ethernet specific processing stage EN_PROC, which are connected with each other internally. The ATM processing stage ATM_PROC is connected to the Utopia interface UTOPIA. The Ethernet processing stage EN_PROC is connected to the Ethernet via the internal xMII interface. Both processing stages ATM_PROC, EN_PROC can be connected via a microcontroller interface MPS to a microcontroller—not illustrated—to carry out maintenance and administrative tasks.

The following functions are supported by the ATM processing stage ATM_PROC:
Utopia L2 Interface
Header translation
Memory tools to process header field information (header translation table)
Traffic management to control queues and to control the respective outputs (queue and port scheduling)
Queue routines for the intermediate storage of ATM cells.

It is assumed for the embodiment illustrated in FIG. 1 that, starting from a communication device—not illustrated—connected to the first connection unit AE1 via the first user access line TLN1, information or ATM cells are transmitted via a virtual connection—represented in FIG. 1 by a broken line double arrow vc1—via the Ethernet EN and the central unit ZE to a destination—not illustrated—arranged in the first communication network KN1. It is further assumed that, starting from a communication device connected to the first connection unit AE1 via the $n^{th}$ user access line TLNn, information or ATM cells are transmitted via a second virtual connection—represented in FIG. 1 by a broken line double arrow vc2—via the Ethernet EN and the central unit ZE to a destination—not illustrated—arranged in the higher second communication network KN2. It is further assumed that the ATM cells cell(vc1), cell(vc2) transmitted via the two virtual connections vc1,2 are each assigned to the ATM Service Class CBR.

In the following the method according to the invention is explained in more detail:

As opposed to the Frame-Based-ATM-Over-Ethernet Standard (FATE) of the ATM Forum mentioned above, according to the invention at least one complete ATM cell, i.e. at least one comprising a destination and user data field, is transmitted with 53 bytes data volume, which can be assigned to different virtual connections—here vc1 and vc2. Further the method according to the invention is not limited to the connection type AAL 5. According to the invention ATM cells arriving at the communication device DSLAM, or at the connection units AE1 . . . z, or at the central unit ZE, and to be forwarded accordingly, are added to the user data field nf or payload field of an Ethernet frame dp of the Ethernet EN arranged within the communication device DSLAM by accordingly provided control or insertion tools CONT. An Ethernet frame dp can contain 1 to n message or ATM cells, whereby the number n of the added ATM cells is only limited by the maximum possible length of an Ethernet frame according to the standard. According to the standard, the normal length of an Ethernet frame is set at 1536 bytes. In certain applications, this length can, however, be increased.

As can be seen from FIG. 2 and FIG. 3, the ATM cells cell(vc1), cell(vc2) transmitted from the users via the respective user access lines TLN1,n and via the respective xDSL modem, xDSL-MOD, to the first connection unit AE1, are transmitted via the Utopia interface UTOPIA to the control unit CONT arranged in the connection unit AE1. According to FIG. 3 the ATM cells cell(vc1), cell(vc2) arriving at the control unit CONT are forwarded first to the ATM processing unit ATM_PROC.

Figure 4:
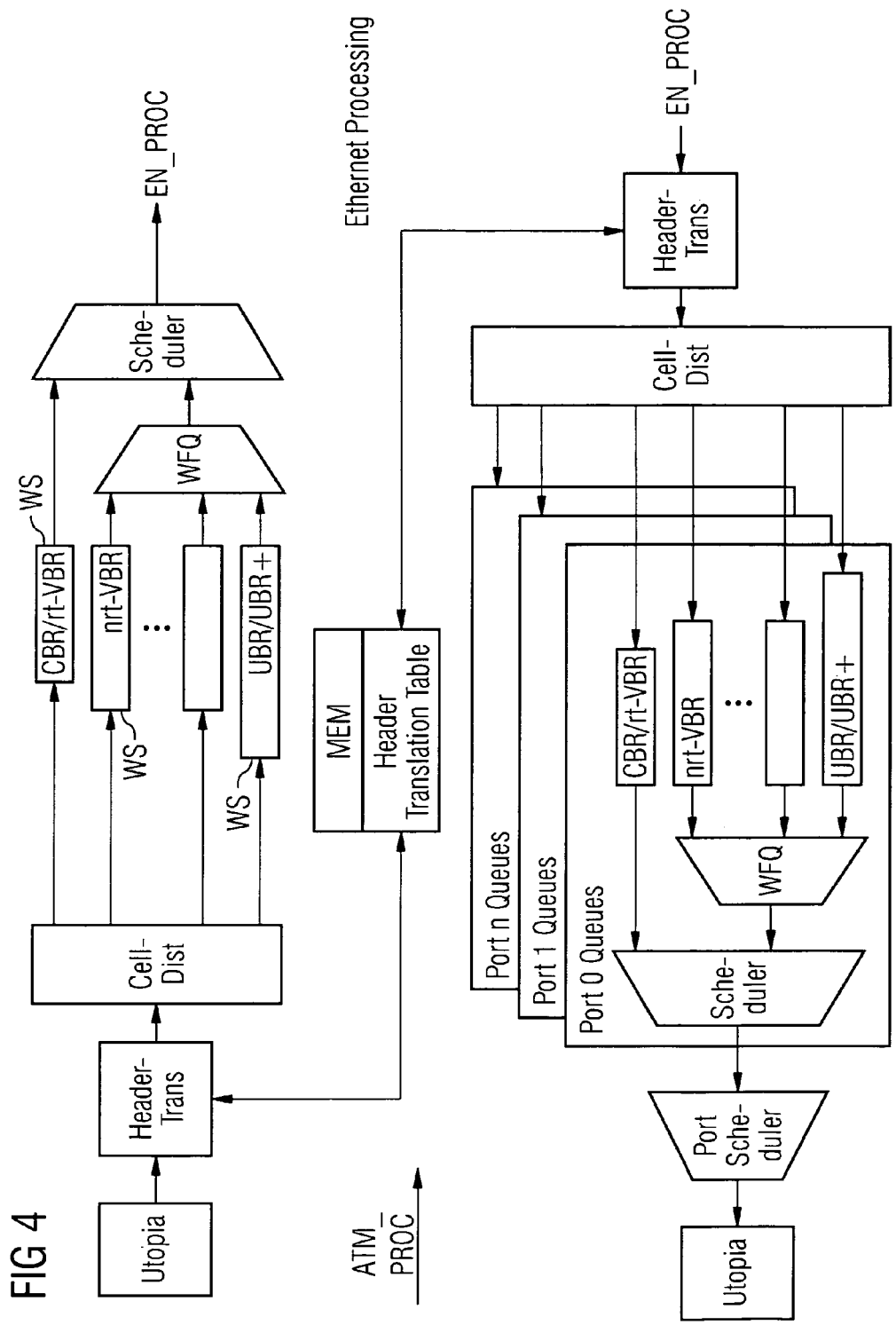

The functional structure of this ATM processing unit ATM_ PROC is described in more detail in FIG. 4. The ATM cells cell(vc1), cell(vc2) received by the Utopia interface are first translated by the header field processing unit Header-Trans according to the "Header Translation Table" information stored in the memory MEM, i.e. the VPI/VCI values (Virtual Path Identifier, Virtual Channel Identifier) held in the header field of the respective ATM cells are modified correspondingly. This is necessary as in user access networks implementation requires that the respective ATM cells are usually sent with the same VPI/VCI values from the user side and thus normally there is no possibility of distinguishing between the individual established virtual connections or PVCs (Permanent Virtual Connections). After the translation, the individual ATM cells cell(vc1), cell(vc2) are forwarded by cell distribution tools Cell-Dist according to their associated ATM service class in the familiar way to the accordingly arranged queues. The following ATM service classes, for example, are supported by the ATM processing unit ATM_PROC:

CBR (Constant Bit Rate)
rt-VBR (real time Variable Bit Rate)
nrt-VBR (non real time Variable Bit Rate)
UBR (Unspecified Bit Rate)
UBR+

As can be seen from FIG. 4, an appropriate queue WS is provided for each of the supported ATM service classes, in which queue the respective ATM cells arriving are distributed and stored by the cell distribution tools Cell-Dist. The individual queues WS are each assigned queue read tools WFQ, schedulers, by means of which the ATM cells arranged in the individual queues WS are read according to their respective priority or ATM service class and are forwarded to the Ethernet processing unit EN_PROC. The read tools WFQ, schedulers, support "Strict Priority Scheduling", so that the ATM cells with the highest priority are read and sent first. It should be noted that the ATM cells arriving at the ATM processing unit ATM_PROC and the ATM cells to be forwarded in the direction of the user are distributed and read in the appropriate manner in respective queues provided for this and forwarded via the Utopia interface UTOPIA—illustrated in the bottom half of FIG. 4.

Figure 5:
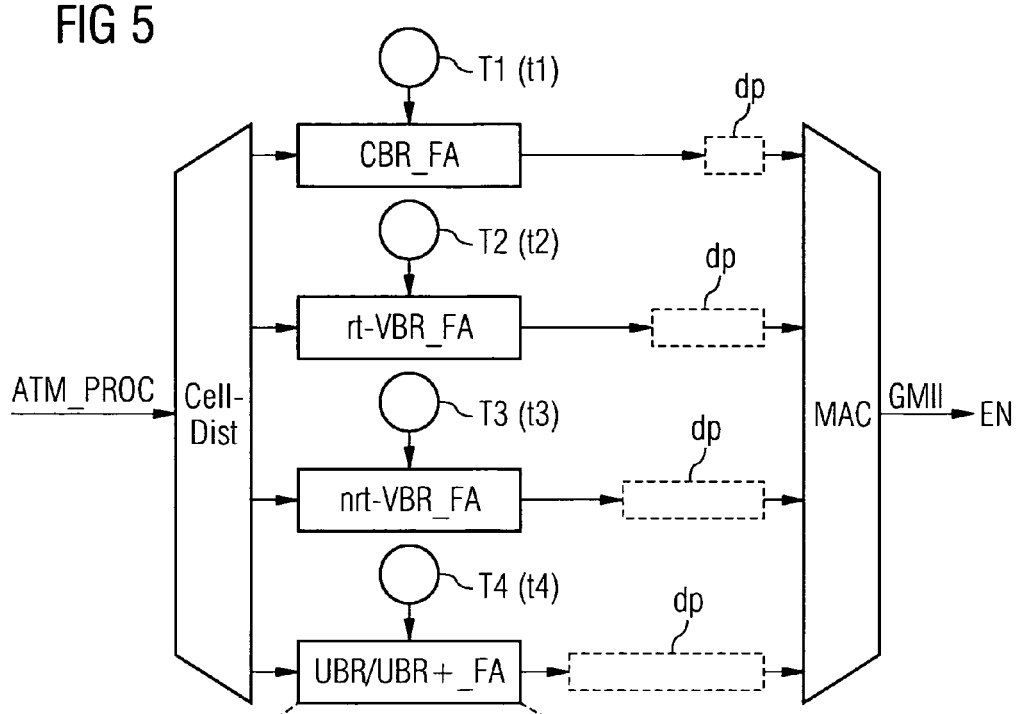

The functional structure of the Ethernet processing unit EN_RPOC is illustrated in FIG. 5. For each ATM service class provided in the ATM user access network ACCESS tools are provided to form Ethernet data frames—in the following called "Frame Assembly Instances" CBR_FA, rt_VBR_FA, nrt_VBR_FA, UBR/UBR+_FA—by means of which the respective ATM cells cell(vc1), cell(vc2) are added or mapped to the respective Ethernet frame formed. Several ATM cells with different VPI/VCI values can be mapped to an Ethernet frame at a time. According to the invention, however, it is always only ATM cells of one service class that are added to the same Ethernet frame dp. In the application scenario illustrated in FIG. 1, the ATM cells cell(vc1), cell(vc2) transmitted via the two virtual connections vc1, 2 set up and respectively comprising the ATM service class "Constant Bit Rate, CBR" are forwarded by the cell distribution tools Cell-Dist to the Frame Assembly Instance CBR_FA provided correspondingly for this. According to the sequence transmitted from the ATM processing unit ATM_PROC, the ATM cells of both virtual connections cell(vc1), cell(vc2) are added to an Ethernet data frame dp by the Frame Assembly Instance CBR_FA—see FIG. 6.

Figure 6:
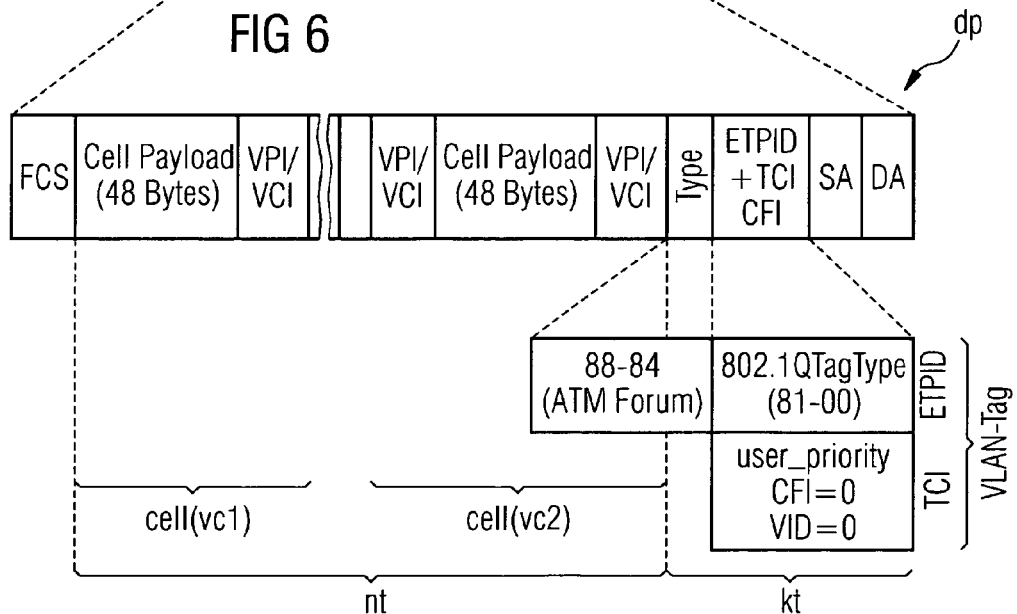

As can be seen from FIG. 6, the Ethernet data frame dp is designed in accordance with the IEEE Standard 802.1Q-1998. This Ethernet data frame dp contains a modified header field kf—called "VLAN-Tag" in FIG. 6—with a specific "user_priority" in the "Tag Control Information Field" (TCI). According to the invention, a transmission priority corresponding to the priority of the ATM cells added respectively to the user data field nf of the respective Ethernet data frame dp is entered into the "user_priority" field of the TCI field. The application of the "Tag Frame Format" and the structure of the TCI field of the "Ethernet encoded tag header" ETPID is described under Point 9.3 of the IEEE Standard 802.1 Q-1998.

The mapping as described and using the IEEE standard 802.1Q-1998 ensures that each ATM service class can be mapped to a corresponding "Ethernet User_Priority". A separate VLAN identifier or VLAN user priority can be allocated for each ATM service class. Below a proposal for a possible mapping of ATM service classes to "VLAN User Priority" is set out in the form of a table.

| ATM Service Class | VLAN User Priority |
| --- | --- |
| CBR | 6 |
| Real Time-VBR | 5 |
| Non Real Time VBR | 4 |
| UBR | 0 (default) |

This proposal ensures that ATM cells with the highest priority are also transmitted or dealt with in the Ethernet EN with sufficiently high priority. Thus, by applying the "Class Of Service" characteristics, ATM cells can also be transmitted by means of Ethernet switches via communication networks locally extended and designed in accordance with the Ethernet transmission procedure.

The length of the Ethernet data frames dp constructed by the respective Frame Assembling Instances CBR_FA, rt_VBR_FA, nrt_VBR_FA and UBR/UBR+_FA results from the type of the data traffic to be transmitted at the time, i.e. from the respective priority or ATM service class of the ATM cells added at the time. If, for example, an Ethernet data frame dp is formed with ATM cells added to it, which cells run real time data traffic (i.e. rt-VBR), then this Ethernet data frame must be restricted in size. Otherwise the dwell time of the first ATM cell added to the Ethernet data frame dp would become too long, thus resulting in increased delay times or delays and the real time requirements can no longer be fulfilled.

Fulfilling real time requirements represents, however, an essential part in the transmission of ATM cells via a communication network EN designed in accordance with the Ethernet transmission procedure. A delay time dependent frame assembling was realized according to the invention in order to fulfill this requirement. This said frame ensures that specified dwell times of the ATM cells added to the respective Ethernet data frames dp are not exceeded. It is known from the ATM transmission technology that when a virtual ATM connection is created, the instances involved agree or negotiate further connection-particular transmission parameters in addition to the respective ATM service class. For instance, the ATM conforming "Cell Delay Variation Tolerance" or CDVT is an example of such a transmission parameter. According to the invention, the length of the Ethernet data frames dp formed by the respective Frame Assembling Instances CBR_FA, rt_VBR_FA, nrt_VBR_FA and UBR/UBR+_FA is assigned both by the respective ATM service class and by the respective connection-particular transmission parameters—here, for instance, by the connection-particular assigned Cell Delay Variation Tolerance, CDVT. The lower the CDVT value assigned for an ATM connection is, the greater is the real time requirement and the shorter the respective Ethernet data frame dp formed must be. If ATM cells of different virtual connections—e.g. cell(vc1), cell(vc2)—are added to an Ethernet data frame dp, then the length of the Ethernet data frame dp is determined by the smallest CDVT value present in the respective ATM cells to be added to this data frame.

As can be seen from FIG. 5, each Frame Assembling Instance CBR_FA, rt_VBR_FA, nrt_VBR_FA and UBR/UBR+_FA is allocated a configurable timer T1 . . . 4, which controls the formation of the respective Ethernet data frames dp. Each timer T1 . . . 4 is initiated when the first ATM cell is read in or added to the respective Ethernet data frame dp. The timer T1 . . . 4 is used to monitor the time for filling an Ethernet data frame dp and also to monitor that the Ethernet data frames formed are sent on time. Thereby the times t1 . . . 4 assigned by the individual timers T1 . . . 4 are dependent on the respective lowest CDVT value of the respective ATM cells to be added to an Ethernet data frame dp. If, for example, ATM cells of the ATM service class CBR with a very low CDVT value are transmitted (these ATM cells belong, for example, to a permanently established virtual connection with high real time requirements), then this timer—here e.g. T1—has a very low value t1, i.e. the respective ATM cells to be added only dwell in the Frame Assembling Instance CBR_FA for a very short period of time, so that only relatively short Ethernet data frames DP are formed by this instance. In the worst-case scenario, only one ATM cell at a time is transmitted per Ethernet data frame. It should be noted that the maximum dwell time of ATM cells in the respective Frame Assembling Instance CBR_FA, rt_VBR_FA, nrt_VBR_FA and UBR/UBR+_FA can be set separately for each ATM service class. For example, according to the embodiment, the following relations can apply between the timers: t1<t2<t3<t4. In FIG. 5 the length of the respective Ethernet data frames dp formed resulting from this relation is illustrated respectively by a broken line rectangle.

The times t1 . . . 4 assigned by the individual timers T1 . . . 4 can be configured by external network management—e.g. when setting up the individual ATM connections—as well as at the run time, so that ATM connections temporarily set up—"switched circuit connections"—are taken into account.

The Ethernet data frames dp formed by the individual Frame Assembling Instances CBR_FA, rt_VBR_FA, nrt_VBR_FA and UBR/UBR+_FA and designed in accordance with the IEEE standard 802.3 or 802.1Q-1998 are forwarded to an access unit MAC for controlling the access to the transmission medium—here the Ethernet conforming communication network EN. Via the access unit MAC, the Ethernet data frames dp to be transmitted are forwarded to the Ethernet EN via an internal interface xMII. The Ethernet data frames dp transmitted to the Ethernet EN are transmitted via the latter to a destination—in this embodiment the central unit ZE—assigned by the destination information contained in the header field kf of the respective Ethernet data frame. The ATM cells cell(vc1), cell(vc2) transmitted in this way to the destination, i.e. to the central unit ZE, are extracted from the respective Ethernet data frame by the control tools CONT, whereby the information to be transmitted via the first virtual connection vc1—i.e. the payload quota of the ATM cells cell(vc1)—is converted in known manner by the control unit CONT arranged in the central unit ZE into information that conforms to the IEEE standard 802.3, i.e. Ethernet data frames, and is forwarded to the first communication network KN1. The information or ATM cells cell(vc2) to be transmitted via the second virtual connection vc2 are forwarded by the control unit CONT to the second communication network KN2 designed in accordance with the ATM.

The method according to the invention has the advantage that ATM cells comprising different VPI/VCI values but assigned to the same ATM service class can be added to an Ethernet data frame together and transmitted via the Ethernet transparently. This allows the Ethernet overhead to be reduced, whereby, at the same time, a limit is set on the time required for the mapping of the ATM cells in the Ethernet data frame (Frame Assembling Time). The number of ATM cells to be added at a time to an Ethernet data frame dp—i.e. the fill status of the respective payload of an Ethernet data frame—is controlled in the way according to the invention per frame assembling instance firstly by the respective ATM service class and also by an additional connection-particular transmission parameter—e.g. CDVT value—of the respective ATM cells to be added. Hereby, per frame assembling instance, the respective lowest CDTV value of the respective ATM cells to be added is taken into consideration, so that the delay of the ATM cells when they are being added to the respective Ethernet data frame is monitored and unnecessary delays are prevented.

It should be noted that when the Ethernet data frames are being filled with ATM cells further connection-particular transmission parameters can be taken into consideration. By this means, the dwell time arising when an ATM cell is transmitted is limited to a previously defined value even when the traffic occurrence is low, so that the method according to the invention can be set even more precisely to real time requirements that have to be met.

Further it should be noted that the cell oriented user access network ACCESS illustrated in FIG. 1 can be designed in accordance with another packet-oriented transmission procedure—e.g. in accordance with the Internet protocol or TCP/IP—so that, using the method according to the invention, instead of the message cells any type of data packets whatsoever—possibly with prior segmentation or reassembling, "SAR"—can also be added to the data packets or Ethernet data frames of the second communication network.

The invention claimed is:

1. A method for at least partially transmitting a message cell in an access communication network via a packet-oriented communication network, the access communication network having priorities that can be assigned to the message cell, the message cell is transmitted via the access communication network in accordance with the priorities assigned comprising:
    adding the message cell to a user data field of a data packet of the packet-oriented communication network, each message cell added to the same user data field having the same assigned priority;
    deriving a transmission priority from the priority of the added message cell; assigning the derived priority to the data packet; and
    partially transmitting the data packet according to the assigned transmission priority via the packet-oriented communication network.

2. The method according to claim 1, wherein insert functions are provided in the communication network selected from the group consisting of access communication network, packet-oriented communication network, and combination thereof by means of which functions, for each priority provided in the first communication network respectively the data packet comprising the correspondingly derived transmission priority is formed, the message cell comprising the corresponding priority is added to the user data field of the data packet, and the data packet is at least partially transmitted via the packet-oriented communication network.

3. The method according to claim 1, wherein the message cell is transmitted within a framework of virtual connections set up over the access communication network, the assigned priority of the message cell transmitted via one of the virtual connections represents a connection -particlar priority.

4. The method according to claim 3, wherein a further connection-particular transmission parameter in addition to the connection-particular priority is assigned to the message cell.

5. The method according to claim 4, wherein insert functions are designed such that the message cell is at least partially forwarded via the packet-oriented communication network ,according to the further connection-particular transmission parameter of the message cell.

6. The method according to claim 1, wherein the access communication network is designed in accordance with an asynchronous transfer mode, in that by means of the priorities provided in the access communication network respectively, a traffic type defined in accordance with the asynchronous transfer mode forum and ITU-T is represented, or a specific asynchronous transfer mode service class is represented.

7. The method according to claim 6, wherein a cell delay variation tolerance specified as part of an established asynchronous transfer mode connection is represented by further assigned connection-particular transmission parameter.

8. The method according to claim 7, wherein insert functions are designed in such a way that the message cell is partially forwarded via the packet-oriented communication network according to a lowest specified cell delay variation tolerance value of the message cell.

9. The method according to claim 1, wherein a second packet-oriented communication network and the data packets transmitted therein are designed in accordance with the IEEE standard 802.3.

10. The method according to claim 9, wherein the data packets transmitted via the packet-oriented communication network are designed in accordance with the IEEE standard 802.1 Q-1998, whereby the transmission priority allocated to the data packet transmitted is determined by $user_{13}$ priority information in a tag control information data field of an Ethernet-encoded tag header.

11. The method according to claim 1, wherein information representing a number of the message cells added to the user data field is added to the data packet.

12. The method according to claim 1, wherein a destination information is added to the data packet, the data packet and the message cell therein are transmitted to a destination represented by the destination information of the data packet in the packet-oriented communication network.

13. The method according to claim 12, wherein the message cell transmitted are forwarded according to routing information contained in the message cells.

14. The method according to claim 12, wherein user information contained in the message cell is forwarded according to routing information contained in the respective message cells.

15. A communication arrangement comprising an access communication network at least partially transmitting message cells via a packet-oriented communication network, wherein
    priorities assigned to the message cells are provided in the access communication network, the message cells are transmitted via the access communication network according to the priorities assigned thereto,
    insert tools are provided in the network selected from the group consisting of the access communication network, the packet-oriented communication network, and a combination thereof, such that at least one of the message cells to be transmitted and comprising a same assigned priority are added to a user data field of at least one data packet of the packet-oriented communication network,
    assign tools are allocated to the insert tools such that a transmission priority derived from the priority of the at least one added message cell is assigned to the at least one data packet, and
    the insert and assign tools are designed such that the at least one data packet is at least partially transmitted together with the at least one added message cell according to the assigned transmission priority via the packet-oriented communication network.

16. The communication arrangement according to claim 15, wherein the insert and assign tools are designed such that for each priority provided in the access communication network respectively the at least one data packet comprising the correspondingly derived transmission priority is formed, the at least one message cell comprising the corresponding priority is added to the user data field of the at least one formed data packet, and the at least one data packet is at least partially transmitted via the packet-oriented communication network.

17. The communication arrangement according to claim 15 wherein the insert tools are designed such that the at least one message cell to be transmitted and comprising the same assigned priority is added to the user data field of the respective at least one data packet
    and the at least one data packet is at least partially forwarded via the packet-oriented communication network according to the at least one further connection-particular transmission parameter assigned to the respective at least one message cell added to the user data field.

18. A communication device arranged in an access communication network, and at least partially transmitting message cells in the access communication network via a packet-oriented communication network arranged in the communication device, the access communication network assigning a priority to the message cells, and the message cells are transmitted via the access network according to the priority assigned, wherein insert tools are provided in the communication device such that at least one of the message cells to be transmitted and comprising a same assigned priority are added to a user data field of at least one data packet of the packet-oriented communication network, assign tools are allocated to the insert tools and arranged in the communication device such that a transmission priority derived from the priority of the at least one added message cell is assigned to the at least one data packet, and the insert and assign tools are designed such that the at least one data packet is at least partially transmitted together with the at least one added message cell according to the assigned transmission priority via the packet-oriented communication network.

19. The communication device according to claim 18, wherein the insert and assign tools are designed in such a way that for each priority provided in the access communication network respectively the at least one data packet comprising the correspondingly derived transmission priority is formed, the at least one message cell comprising the corresponding priority is added to the user data field of the at least one formed data packet, and at least one data packet is at least partially transmitted via the packet-oriented communication network.

20. The communication device according to claim 18, wherein the insert and assign tools are arranged respectively on at least one connection unit arranged in the communication device and connected to the first and second communication network and/or on at least one central unit centrally arranged in the communication device and connected to the first and second communication network.

\* \* \* \* \*